(12) United States Patent
Thomas et al.

(10) Patent No.: US 10,303,538 B2
(45) Date of Patent: May 28, 2019

(54) COMPUTING SYSTEM ISSUE DETECTION AND RESOLUTION

(71) Applicant: Microsoft Technology Licensing, LLC, Redmond, WA (US)

(72) Inventors: Satish J. Thomas, Sammamish, WA (US); Murtaza Muidul Huda Chowdhury, Bellevue, WA (US); Shefy Manayil Kareem, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 429 days.

(21) Appl. No.: 14/659,369

(22) Filed: Mar. 16, 2015

(65) Prior Publication Data

US 2016/0274961 A1 Sep. 22, 2016

(51) Int. Cl.
| | | |
|---|---|---|
| G06N 5/02 | (2006.01) | |
| G06F 11/07 | (2006.01) | |
| G06F 17/27 | (2006.01) | |
| G06N 99/00 | (2019.01) | |
| G06Q 10/06 | (2012.01) | |
| G06Q 10/10 | (2012.01) | |

(52) U.S. Cl.
CPC ........ *G06F 11/079* (2013.01); *G06F 11/0709* (2013.01); *G06F 11/0751* (2013.01); *G06F 11/0793* (2013.01); *G06F 17/2785* (2013.01); *G06N 5/02* (2013.01); *G06N 99/005* (2013.01); *G06Q 10/06* (2013.01); *G06Q 10/10* (2013.01)

(58) Field of Classification Search
CPC ............. G06F 11/0709; G06F 11/0751; G06F 11/0793; G06F 11/079; G06F 11/0748
See application file for complete search history.

(56) References Cited

U.S. PATENT DOCUMENTS

| 7,080,141 | B1 | 7/2006 | Baekelmans et al. |
| 7,191,364 | B2 | 3/2007 | Hudson et al. |
| 7,293,201 | B2 | 11/2007 | Ansari |
| 7,310,625 | B2 | 12/2007 | Wu |
| 7,343,529 | B1 | 3/2008 | Klinkner et al. |

(Continued)

FOREIGN PATENT DOCUMENTS

| EP | 2 801 938 A1 | 11/2014 |
| WO | WO 2008083345 A2 | 7/2008 |

OTHER PUBLICATIONS

International Search Report and Written Opinion for International Patent Application No. PCT/US2016/022395, dated May 19, 2016, date of filing: Mar. 15, 2016, 12 pages.

(Continued)

*Primary Examiner* — Jigar P Patel
(74) *Attorney, Agent, or Firm* — Christopher R. Christenson; Kelly, Holt & Christenson PLLC

(57) ABSTRACT

Explicit and implicit feedback information, that is indicative of an issue in a deployed computing system, is collected. Information identifying attempted resolutions for the issue is collected as well. A knowledge base is generated that identifies issues and successful resolutions for those issues. During runtime, issues are detected, either explicitly or implicitly, and the knowledge base is accessed to determine whether a resolution has already been identified. If so, it can be proactively provided to the computing system to address the issue.

11 Claims, 12 Drawing Sheets

(56) References Cited

U.S. PATENT DOCUMENTS

| | | | |
|---|---|---|---|
| 7,373,553 B2 | 5/2008 | Tripp et al. | |
| 7,444,315 B2 | 10/2008 | Wu | |
| 8,140,514 B2 | 3/2012 | Nguyen et al. | |
| 8,473,251 B1 | 6/2013 | Noth et al. | |
| 8,799,258 B2 | 8/2014 | Mule | |
| 8,823,536 B2 | 9/2014 | Avner et al. | |
| 2008/0034060 A1 | 2/2008 | Fisher, Jr. | |
| 2010/0057677 A1 | 3/2010 | Rapp et al. | |
| 2013/0282424 A1* | 10/2013 | Babu | G06Q 10/10 705/7.26 |
| 2013/0339787 A1* | 12/2013 | Bala | G06F 11/1433 714/15 |
| 2014/0173350 A1 | 6/2014 | Roy et al. | |
| 2015/0032751 A1* | 1/2015 | Ting | G06F 17/30598 707/738 |
| 2016/0189558 A1* | 6/2016 | McGann | G09B 5/06 434/219 |
| 2017/0032091 A1* | 2/2017 | Rudorfer | G06F 19/3412 |

OTHER PUBLICATIONS

"International Preliminary Report on Patentability Issued in PCT Application No. PCT/US2016/022395", dated Sep. 21, 2016, 10 Pages.

Second Written Opinion for International Patent Application No. PCT/US2016/022395 dated Jul. 22, 2016, filed Mar. 15, 2016, 10 pages.

Kushman, et al., "Enabling Configuration-Independent Automation by Non-Expert Users", : In Proceedings of the 9th USENIX conference on Operating systems design and implementation, Oct. 4, 2010, 14 pages.

Zhang, et al., "Automated Diagnosis of Software Configuration Errors", In Proceedings of International Conference on Software Engineering, May 18, 2013, 10 pages.

"Driving Business Excellence Through Innovative IT Service Management", In WhitePapers of Cognizant, Apr. 2014, 16 pages.

* cited by examiner

COMPUTING SYSTEM ISSUE DETECTION AND RESOLUTION

BACKGROUND

Computing systems are currently in wide use. Many different types of computing systems may be deployed at a given organization, in order to perform processes, workflows, and tasks at the organization.

Such computing systems are often enterprise computing systems that are originally manufactured by a computing system manufacturer. They can then be customized, and sometimes heavily customized, prior to being deployed at the end user organization. In addition, they can be deployed at end user organizations in a wide variety of different environments, contexts, and deployed configurations.

At times, users of the computing systems, at the end user organizations, may run into various issues. The issues may be issues that are internal to the computing system product itself, such as functional and performance issues. The issues can also be external to the computing system product, but they can be caused by the environment that the computing system product is running in.

Normally, such issues are recognized by the computer system manufacturer only when the end users (e.g., customers) report them. When the issues are reported, contextual information regarding the environment and deployed configuration where the computing system is running, is generally not provided.

Some computing system manufacturers provide customer feedback forums. In such scenarios, feedback can be captured from forums where customers or partners provide feedback. The feedback can be shared explicitly with the research and development part of the computing system manufacturer. This type of feedback is relatively limited.

The discussion above is merely provided for general background information and is not intended to be used as an aid in determining the scope of the claimed subject matter.

SUMMARY

Explicit and implicit feedback information, that is indicative of an issue in a deployed computing system, is collected. Information identifying attempted resolutions for the issue is collected as well. A knowledge base is generated that identifies issues and successful resolutions for those issues. During runtime, issues are detected, either explicitly or implicitly, and the knowledge base is accessed to determine whether a resolution has already been identified. If so, it can be proactively provided to the computing system to address the issue.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, some computing system manufacturers provide feedback forums for receiving feedback from customers or partners. However, a wide variety of different types of implicit feedback are generated as users use the computing system. However, this is normally not captured or used in detecting or resolving issues.

Figure 1:
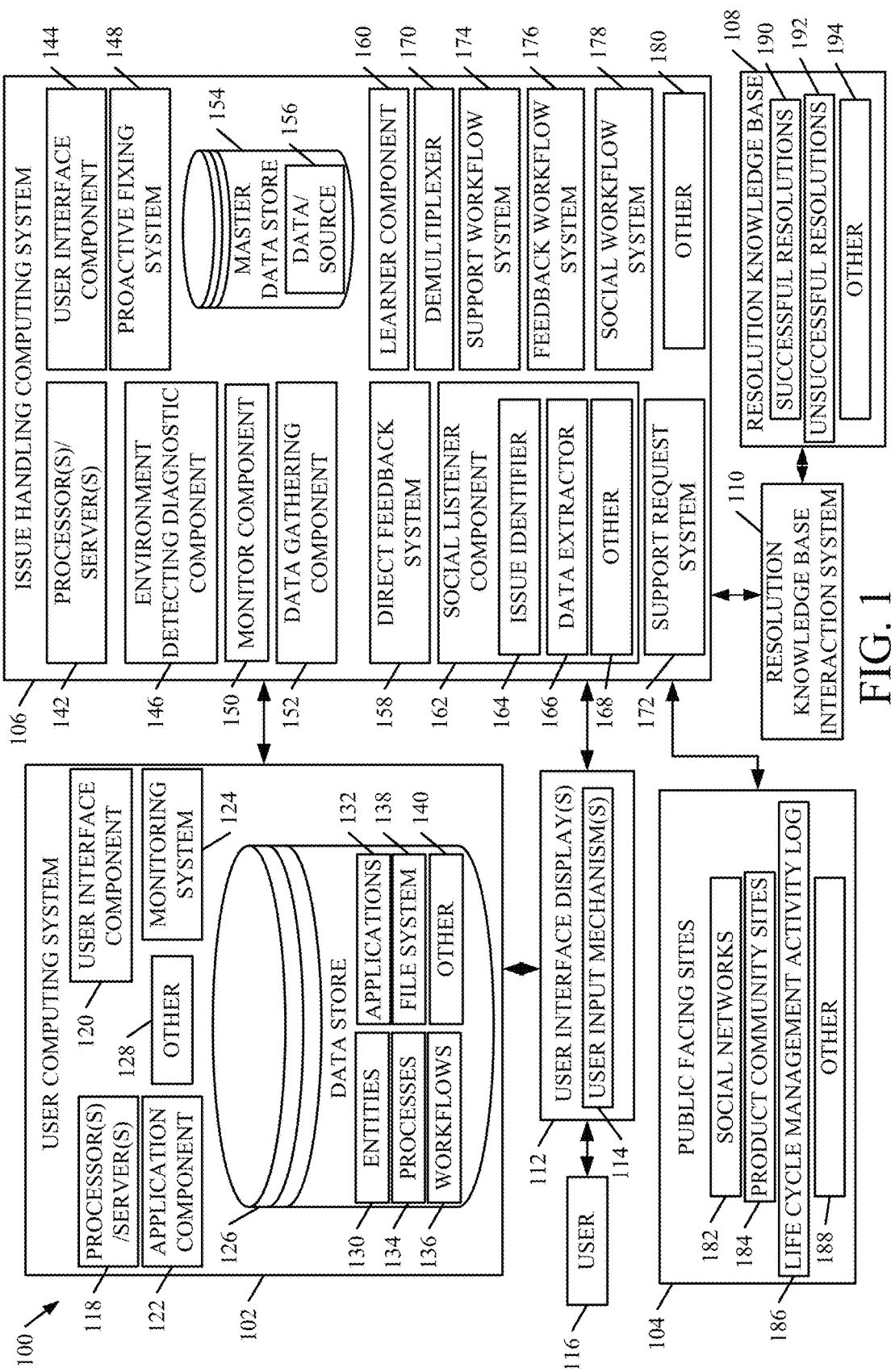
FIG. 1 is a block diagram of one example of an issue detection and correction architecture.

FIG. 1 is a block diagram of one example of an issue detection and correction architecture 100 that can capture and use not only diagnostics data (which is contextual information about a computing system deployment) but environmental data as well. It can also include feedback (which is both implicit and explicit) from product monitoring components and social data. Architecture 100, shown in FIG. 1, illustratively includes user computing system 102, a set of public facing sites or sources 104, issue handling computing system 106 and resolution knowledge base 108, as well as resolution knowledge base interaction system 110. FIG. 1 also shows that user computing system 102 and issue handling computing system 106 (or either of them) illustratively generate user interface displays 112 with user input mechanisms 114 for interaction by user 116. User 116 illustratively interacts with, or actuates, the user input mechanisms 114 in order to control and manipulate user computing system 102, or issue handling computing system 106, or both. Before describing the overall operation of architecture 100, a number of the items shown in architecture 100 will first be described.

User computing system 102 illustratively includes one or more processors or servers 118, user interface component 120, application component 122, monitoring system 124, data store 126, and it can include other items 128. Data store 126, itself, illustratively includes entities 130, applications 132, processes 134, workflows 136, one or more file systems 138, and it can include other items 140. Entities 130 illustratively describe and define various items within computing system 102. For instance, a customer entity illustratively describes and defines a customer. A product entity illustratively describes and defines a product. An electronic mail entity illustratively describes and defines an electronic mail message. A document entity illustratively describes and defines a document.

Application component 122 illustratively runs applications 132 to perform processes 134 and workflows 136. In doing so, it illustratively accesses a file system 138 and it can operate on entities 130. Monitoring system 124 illustratively monitors a wide variety of different types of information within user computing system 102. For instance, it can monitor environmental information that identifies the computing system environment where applications 132 are run. This may include such things as the identity of the servers or processors 118, the amount of memory available, the versions of the various operating systems or applications being run, among a wide variety of other environmental information. It can also illustratively monitor diagnostic information which may include such things as CPU usage, memory usage, network traffic, among a wide variety of other things.

Issue handling computing system 106 illustratively includes one or more processors or servers 142, user interface component 144, environment detecting diagnostic component 146, proactive fixing system 148, monitor component 150, data gathering component 152, master data store 154 (that stores records 156 that identify data and the source of the data) direct feedback system 158, learner component 160, social listener component 162 (that illustratively includes issue identifier 164, data extractor 166, and it can include other items 168) demultiplexer 170, support request system 172, support workflow system 174, feedback workflow system 176, social workflow system 178, and it can include other items 180. Environment detecting diagnostic component 146 illustratively detects environmental information in user computing system 102. Monitor component 150 illustratively interacts with monitoring system 124, to monitor performance and other functional information from computing system 102. Direct feedback system 158 illustratively allows users 116 to provide direct feedback regarding a product, such as an application 132, etc. Support request system 172 illustratively allows users 116 to provide explicit support requests to deal with an issue that they have encountered.

Social listener component 162 illustratively monitors information generated by public facing sites 104. Those sites can include such things as social networks 182, product community sites 184, lifecycle management activity log sites 186, and a wide variety of other public facing sites 188. The information generated from sites 104 is provided to social listener component 162. Issue identifier 164 parses and analyzes the information received from sites 104 to identify whether it is referring to one or more different issues. Data extractor 166 extracts data and generates an issue record based on that information.

The information from components 146, 150, 152, 158, 162 and 172 is illustratively provided to data gathering component 152. Data gathering component 152 illustratively stores the data in master data store 154. Each item of data 156 can be stored according to a pre-defined schema, a structure that varies based on source, or in a wide variety of other ways. In any case, it illustratively includes a source identifier that identifies the source of the data.

The information in data store 154 is illustratively provided to learner component 160 and to demultiplexer 170. Demultiplexer 170 illustratively identifies the type of issue represented by the item of data and routes it to an appropriate workflow system. For instance, if it is an express request for engineering support, then demultiplexer 170 routes it to support workflow system 174. If it is an item of direct feedback received through direct feedback system 158, then it can be provided by demultiplexer 170 to feedback workflow system 176. If it is an item received from social learner component 162, then demultiplexer 170 can provide it to social workflow system 178.

Each of the workflow systems 174-178 illustratively carries out a corresponding workflow. Therefore, for instance, support workflow system 174 can carry out an engineering support workflow that allows an engineer to contact the user 116 that submitted the express support request in order to work with the user to identify a resolution. Feedback workflow system 176 may be provided to an engineering team where a resolution is obtained, and then provided back through the same direct feedback system 158 to the users that provided the feedback. Social workflow system 178 may execute a workflow by which resolutions for issues raised at public facing sites 104 are identified and the information is then disseminated back to the public facing sites 104. When a resolution is generated for an issue through the various workflows or otherwise, it is stored in master data store 154.

It will be noted that implicit issues can be identified as well. For instance, if the diagnostic or monitoring information from system 102 identifies that user 116 is about to run out of memory, then this can be provided to data gathering component 152 as well, and be an implicit indication of an issue. It is implicit because no user has expressly indicated that it is an issue, but the issue has indeed been identified. Similarly, it may be that the performance of user computing system 102 (e.g., one of applications 132) is suffering because system 102 has configuration settings that are taking up excess processing overhead or memory, etc. It may also be that the system is running inefficiently for some reason. This type of implicit information can also identify an issue that can be resolved, even before user 116 notices it and expressly indicates to system 106.

All of the information identifying these types of issues is illustratively stored in master data store 154. When it is routed to a given workflow 174-178, and a potential resolution is identified, that is also stored in master data store 154. Data gathering component 152 then receives all of the explicit and implicit feedback and analyzes it to determine whether the suggested resolution actually fixed the problem. The implicit diagnostic and environment information or monitor information can indicate that the performance of the user's computing system 102 has improved, thus indicating that the suggested resolution fixed the problem. Similarly, comments on public facing sites 104 may express positive or negative feedback with respect to the suggested resolution. This can be used to determine whether the suggested resolution was successful. The same can be determined by direct feedback from direct feedback system 158 or from an engineer who performed the support workflow using support workflow system 174 to fix the problem.

Learner component 160 access the information in master data store 154 and clusters it into common types of issues. It then identifies a resolution that has been deemed sufficiently reliable (e.g., it has been successfully applied sufficiently often) to fix the issue corresponding to each of the clusters. This information is provided to resolution knowledge base interaction system 110 which stores that information in resolution knowledge base 108. In one example, the information in resolution knowledge base 108 includes clusters and corresponding successful resolutions 190, and it can also include corresponding unsuccessful resolutions 192, which have failed to resolve the issue corresponding to the cluster. It can include other items 194 as well. Clusters and successful resolutions 190 indicate information that has been clustered, by issue, along with one or more successful resolutions for that issue. Clusters and unsuccessful resolutions 192 illustratively includes information that is clustered, by issue, along with a set of unsuccessful resolutions that have been attempted, but have not resolved, the issue associated with each cluster. Of course, these are only examples of the types of information that can be stored in resolution knowledge base 108.

After resolution knowledge base 108 is generated, then the same process can be repeated to identify issues. They can be identified based upon the implicit information or explicit information received by system 106. When an issue is identified and stored in master data store 154, proactive fixing system 148 illustratively first accesses resolution knowledge base 108, through system 110, to determine whether the issue that has just been identified matches any of the clusters in knowledge base 108. If it matches a cluster where a successful resolution has been identified, then proactive fixing system 148 can provide that resolution either automatically back to system 102 to fix the issue, or it can be provided within the particular workflow executed by one of workflow systems 174-178 in addressing the issue. For instance, if the issue is provided by demultiplexer 170 to support workflow system 174, then the resolution identified from knowledge base 108, by proactive fixing system 148, can be automatically surfaced for the support engineer dealing with that issue. Of course, these are examples only.

Figure 2:
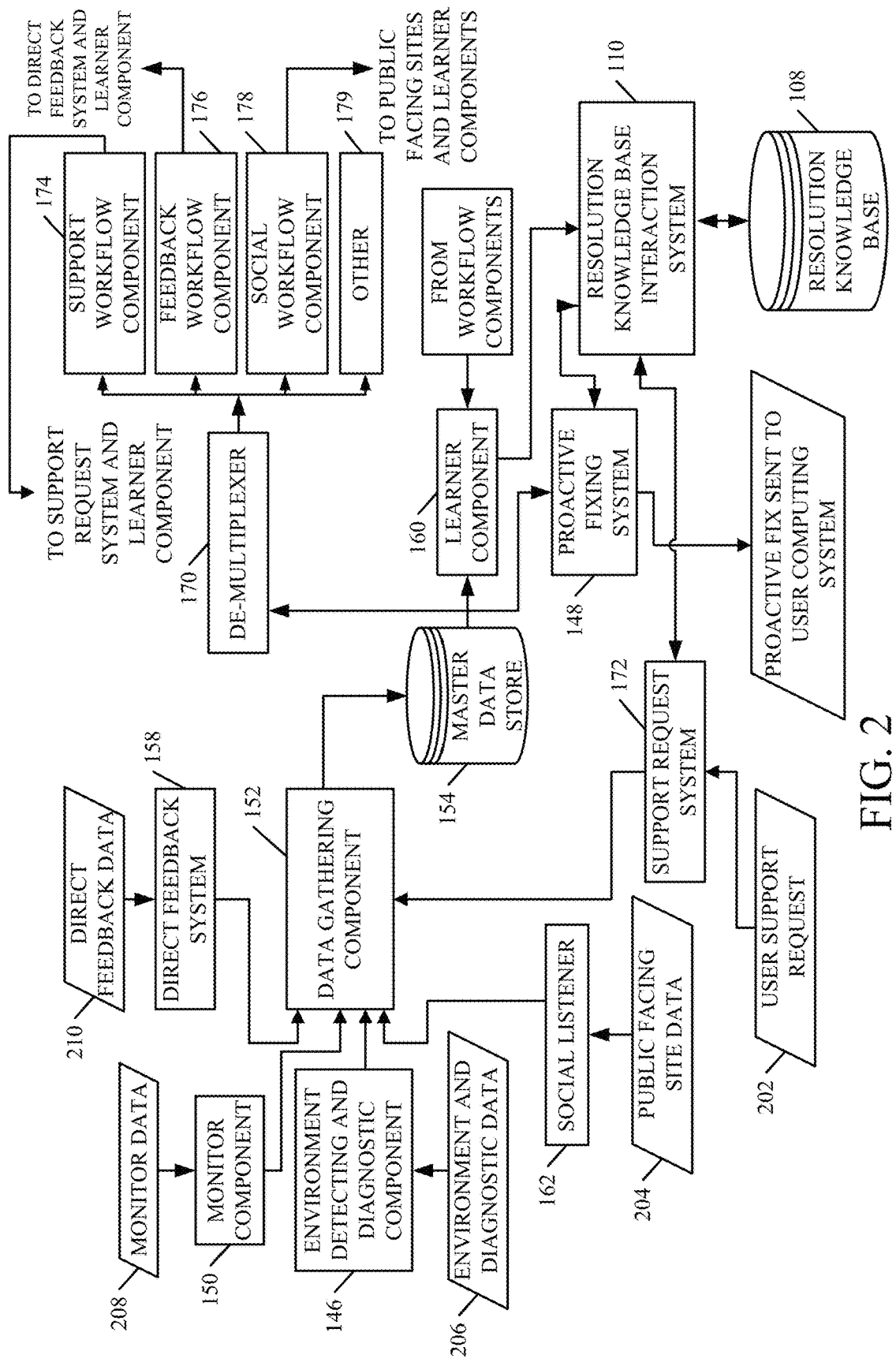
FIG. 2 is a block diagram of portions of the architecture shown in FIG. 1 in a data flow diagram.
Figure 3:
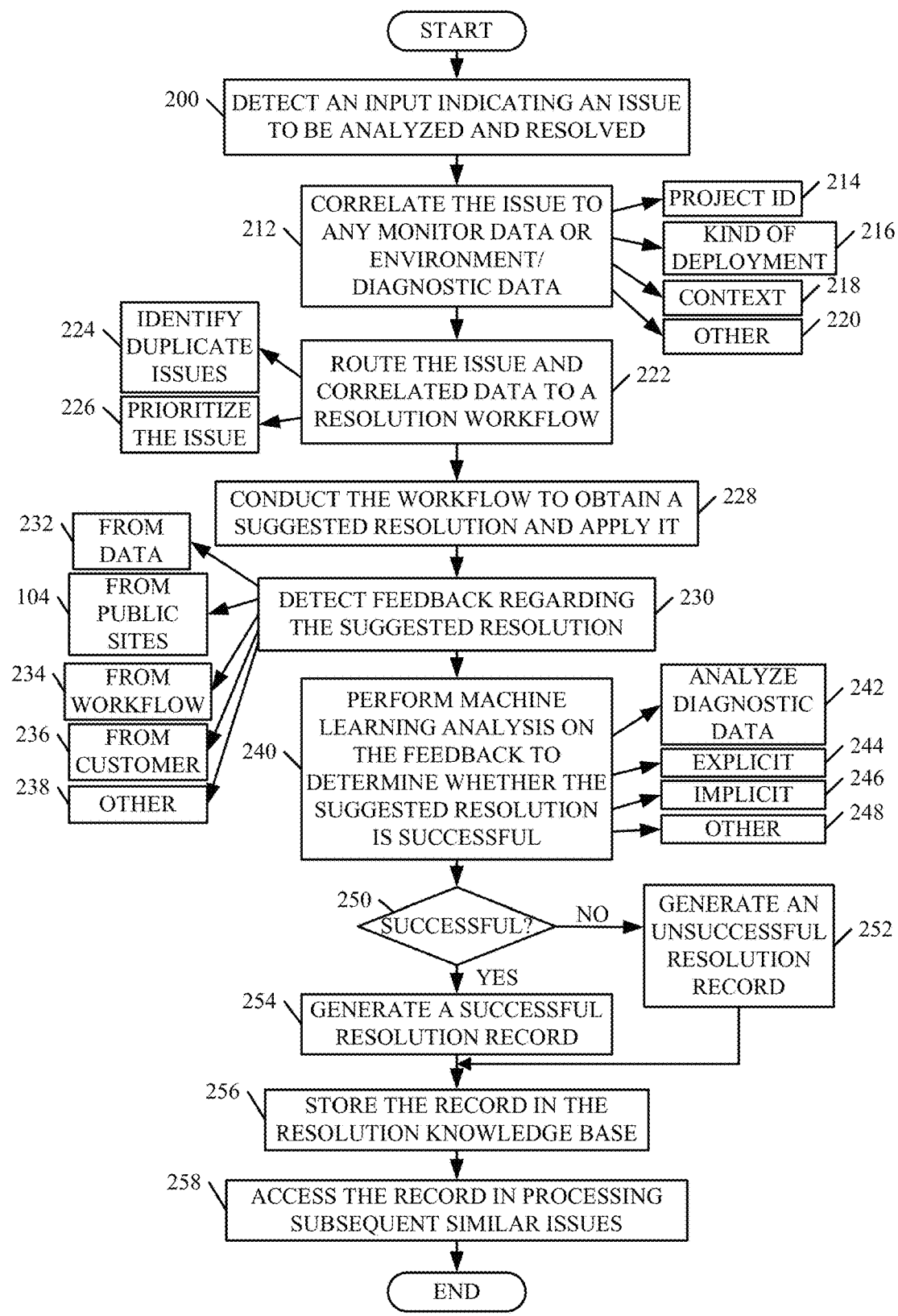
FIG. 3 shows a flow diagram illustrating one example of the operation of the architecture shown in FIG. 2 in gathering data to generate a knowledge base.

The operation of the architecture will now be described in more detail. FIG. 2 shows an abbreviated form of some of the components shown in the architecture 100 of FIG. 1. FIG. 3 shows a flow diagram illustrating one example of the abbreviated architecture shown in FIG. 2 in gathering data at data gathering component 152 and building resolution knowledge base 108. The discussion of FIG. 3 is primarily focused on how resolution knowledge base 108 is built. The use of that knowledge base during runtime is described in greater detail below with respect to FIG. 6. It can continue to be built and refined during runtime, and this is also described below.

To build knowledge base 108, support request system 172 first detects an input indicating an issue to be analyzed and resolved. This is indicated by block 200 in FIG. 3. This can come in terms of a user support request 202 (shown in FIG. 2). It can be based on public facing site data 204 received from public facing sites 104. It can be based on the detected environment and diagnostic data 206, based on the monitored data 208, or based on direct feedback data 210 provided through direct feedback system 158. When information indicating that an issue needs to be resolved is received, data gathering component 152 then correlates that information with any monitor data 206 or environment and diagnostic data 208. This is indicated by block 212 in FIG. 2.

Each of the items of information received by data gathering component 152 may include a project identifier (or project ID 214). Data gathering component 152 can use this to identify the environment, monitored performance information, and diagnostic information corresponding to the system where the issue is occurring. It can also identify the kind of deployment 216, the context within which the issue has arisen 218, among other things 220.

Demultiplexer 170 then retrieves and routes the issue and the correlated data to a resolution workflow 174-178. It can route it to another workflow 179, other than those shown as well. Routing the issue and the correlated data to a resolution workflow is indicated by block 22 in FIG. 3. As is described in greater detail below, when demultiplexer 170 does this, it can also identify that the same issue has been raised by multiple different sources, as indicated by block 224, and it can use this to prioritize the issue as indicated by block 226. For instance, it may be that social listener 162 detects that the issue is being discussed on one of the public facing cites 104. It may also be that direct feedback system 158 is receiving direct feedback data 210 about the issue, and that a user has provided an explicit user support request 202 for the same issue. This would tend to indicate that the issue may be fairly serious, and therefore it is assigned a relatively high priority.

The particular workflow component 174-178 that the issue is provided to then conducts the corresponding workflow to obtain a suggested resolution and to apply it. This is indicated by block 228.

Data gathering component 152 then detects feedback regarding the suggested resolution. This is indicated by block 230. Again, the feedback may be from the monitored data 208 or environment data 206 (collectively represented by 232 in the flow diagram of FIG. 3). It can be from data provided by public sites 104, from the various workflows (as indicated by block 234), or from customers through either direct feedback system 158 or support request system 172. This is indicated by block 236. The feedback can be implicit or explicit feedback from other sources as well, and this is indicated by block 238.

The feedback is correlated to the issue by data gathering component 152 and stored in master data store 154. Learner component 160 then performs machine learning analysis on the feedback to determine whether the suggested resolution was successful. This is indicated by block 240 in FIG. 3. This can include analyzing diagnostic or monitored data from the computing system where the resolution was applied. This is indicated by block 242. It can include receiving an explicit indicator 244, such as from a support engineer, a customer, etc., indicating whether the resolution was successful. It can also include implicit information 246 (such as from the public facing sites 104), or it can include other information and analysis 248. For instance, it can parse the data provided at the public facing sites 104, and that is correlated to the resolution, to indicate whether there is positive or negative sentiment in that data. It can perform this in other ways as well.

If the resolution is unsuccessful, then an unsuccessful resolution record can be generated and stored in knowledge base 108. This is indicated by blocks 250 and 252, respectively. However, if the resolution is successful, then learner component 160 can illustratively generate a successful resolution record as indicated by block 254. The resolution record is then stored in the resolution knowledge base 108 by resolution knowledge base interaction system 110. This is indicated by block 256. The resolution record can then be accessed during subsequent runtime operations to process subsequent, similar issues. This is indicated by block 258, and it is described in greater detail below with respect to FIG. 6.

Figure 4:
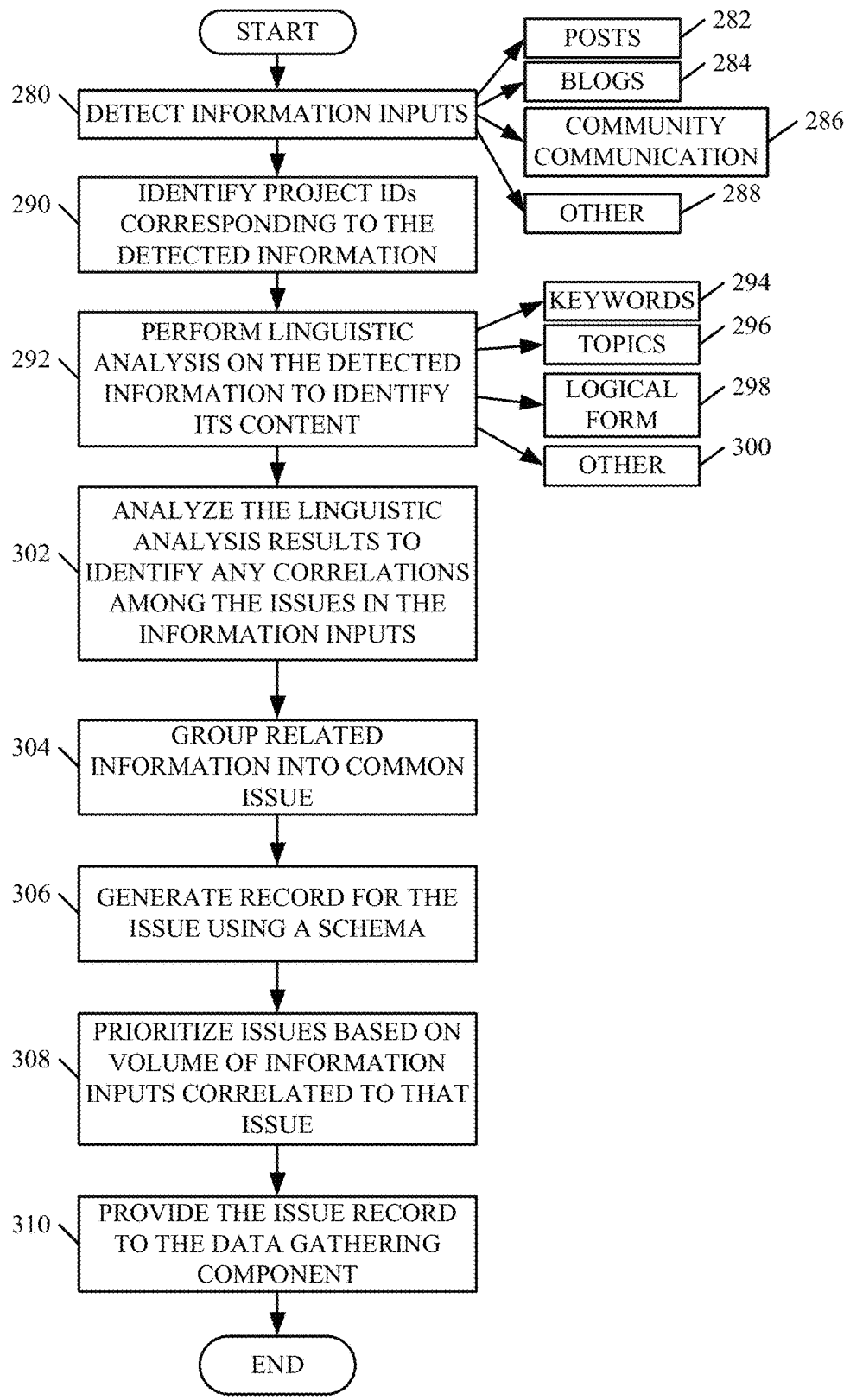
FIG. 4 is a flow diagram illustrating one example of the operation of a social listener shown in FIGS. 1 and 2.

FIG. 4 is a flow diagram illustrating one example of the operation of social listener component 162, in more detail. Issue identifier 164 first detects information inputs from the publicly facing sites 104. This is indicated by block 280 in FIG. 4. Again, the information inputs can be posts 282 on social network or other sites, blog posts 284, community communications on community sites exposed by the computing system manufacturer or other organizations, as indicated by block 286, or a wide variety of other information 288.

In one example, each of the items of information has a project identifier that corresponds to a project within issue handling computing system 106. For example, when a user of a computing system subscribes to it, the user illustratively provides a user identity that corresponds to a project ID.

Organization information also illustratively corresponds to an assigned project ID. Thus, in one example, issue identifier 164 in social learner component 162 also identifies the project IDs corresponding to the detected information. This is indicated by block 290 in FIG. 4.

Issue identifier 164 can include a variety of other components. For instance, it can include natural language processing components or other linguistic analysis components that perform linguistic analysis on the information detected. If the information is a social network post, for instance, then the linguistic analysis components can identify the subject matter of the post and the linguistic content of the post. By way of example, it can identify that the post is identifying to a particular product, and it can also illustratively identify that the post is raising a performance issue with the product, complaining negatively about some feature of the product, etc. It can also illustratively identify key words in the information or other information. Performing linguistic analysis on the detected information to identify its content is indicated by block 292. Identifying key words is indicated by block 294. Identifying different topics is indicated by block 296. It can also illustratively generate a logical form, which is a logical representation of the semantic content of the information. This is indicated by block 298. It can perform other types of linguistic analysis as well, and this is indicated by block 300.

Issue identifier 164 then analyzes the linguistic analysis results to identify any correlations among issues in the information inputs. This is indicated by block 302. By way of example, it may be that two different social network sites include posts that are related to the same technical issue about a particular product. Instead of identifying a separate issue corresponding to each of these posts, issue identifier 164 groups the related information into a common issue is indicated by block 304. Data extractor 166 then extracts data from the various information inputs corresponding to each issue and generates a record for each issue. This is indicated by block 306. In one example, data extractor 166 extracts the data into a common schema. In another example, the schema can vary based upon the source of the data, based upon the issue, based upon the particular product or project that the issue relates to, or based upon a wide variety of other things.

Social listener component 162 then illustratively prioritizes the issues based upon a volume of information inputs correlated to that issue or based on other prioritization criteria. This is indicated by block 308. As mentioned above, it may be that a number of different social networks contain posts that all relate to the same issue. It may be that users are providing explicit feedback regarding the issue, and it may be that the product community sites 184 have a significant amount of traffic corresponding to the issue. With this relatively high volume of information inputs that correspond to the same issue, the priority may be elevated relative to other issues that have a lower volume of corresponding information inputs. Of course, the issues can be prioritized in a wide variety of other ways as well.

Figure 5:
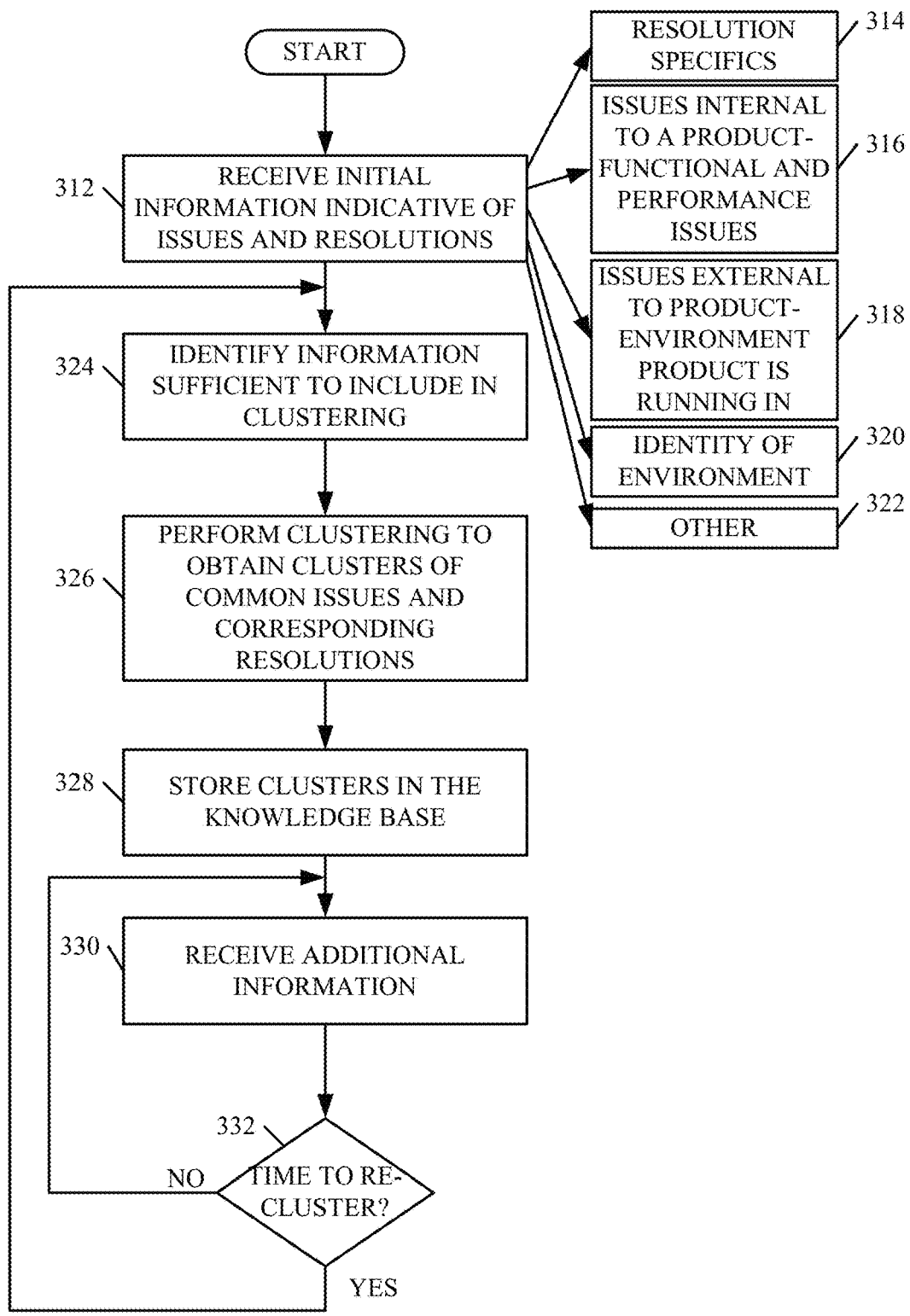
FIG. 5 is a flow diagram illustrating one example of the operation of processing data to generate the knowledge base.

Social listener component 162 then provides the issue record to the data gathering component 152, where it is placed in master data store 154. This is indicated by block 310. FIG. 5 is a flow diagram illustrating one example of how the issue and resolution information is processed prior to being placed in resolution knowledge base 108. The processing described with respect to FIG. 5 can be performed by learner component 160 or resolution knowledge base interaction system 110, or other components. It can also be split among various components as well. For the purposes of the present discussion, it will be assumed that learner component 160 performs all of the processing, although this is only described for the sake of example.

Learner component 160 first receives initial information indicative of issues and their corresponding resolutions. This is indicated by block 312 in FIG. 5. The information can include a specific identity of the resolution that was applied to the issue. This is indicated by block 314. For instance, it can include an identity number associated with a bug fix or another fix that can be applied to remedy the issue. The issues and resolutions can be issues that are internal to a product, such as functional and performance issues. This is indicated by block 316. The issues can also be external to the product. For instance, they can be issues regarding the environment that the product is running in. This is indicated by block 318 in FIG. 5. The information can include the identity of the environment, and it can include a wide variety of other information as well. This is indicated by blocks 320 and 322 in FIG. 5.

Learner component 160 then identifies whether the information for a particular issue is sufficient to include in the clusters in resolution knowledge base 108. This is indicated by block 324. By way of example, it may be that, in order to increase the likelihood that a given resolution actually fixes a given issue, the resolution will not be included in the knowledge base 108 as a fix for that issue until it has been successfully applied at least a threshold number of times. For instance, if a given resolution has been successfully applied to remedy an issue five or more times, then it may be included as information that can be incorporated into the clusters in knowledge base 108. If it has been successfully applied fewer times than that, then it may be held until that threshold is met, before it is included. Of course, if it has been applied successfully some times and unsuccessfully other times, then it may be identified as an unsuccessful resolution, or it may simply be not included as a successful resolution.

Learner component 160 then performs clustering to obtain clusters of information related to common issues, and their corresponding resolutions. For instance, each of the items of information corresponding to an issue will reflect a scenario where the issue arises. Therefore, two different sets of information that correspond to the same issue may have slightly different environments or be observed under slightly different circumstances, etc. However, the issue may be the same fundamental issue. In that case, the items of information and their corresponding resolutions will be clustered into one cluster that represents a single issue.

It may also be that each cluster may have multiple different resolutions. For instance, there may be multiple different ways to resolve the same issue, and those resolutions may all correspond to the same cluster. In that case, the resolutions may be ranked by learner component 160 using a variety of different ranking criteria. By way of example, the resolution that has been successfully applied most often, or that which has been successfully applied in multiple different environments, may be ranked highest. Of course, these are only two examples of ranking criteria and others could be used as well. Performing clustering to obtain clusters of common issues and corresponding resolutions is indicated by block 326 in FIG. 5.

Learner component 160 then provides the clusters to resolution knowledge base interaction system 110, which stores them in resolution knowledge base 108. This is indicated by block 328.

As learner component 160 receives additional information from master data store 154, it may eventually determine that enough information has been received that the data should be re-clustered, or the clusters should be otherwise refined. As an example, it may be that re-clustering will be performed immediately when information corresponding to one set of issues is received, but not for other issues. It may be that issues relating to a certain event type may cause re-clustering to be performed more frequently than other issues. The determination of when re-clustering is to be performed may also depend on whether the amount of new information received is statistically likely to change the clusters. Of course, the decision as to when to re-cluster can be made in other ways as well. Receiving additional information and determining whether it is time to re-cluster is indicated by blocks 330 and 332 in FIG. 5. When it is time to re-cluster, processing reverts to block 324. Until then, the information is simply saved until it is time to re-cluster.

Figure 6A:
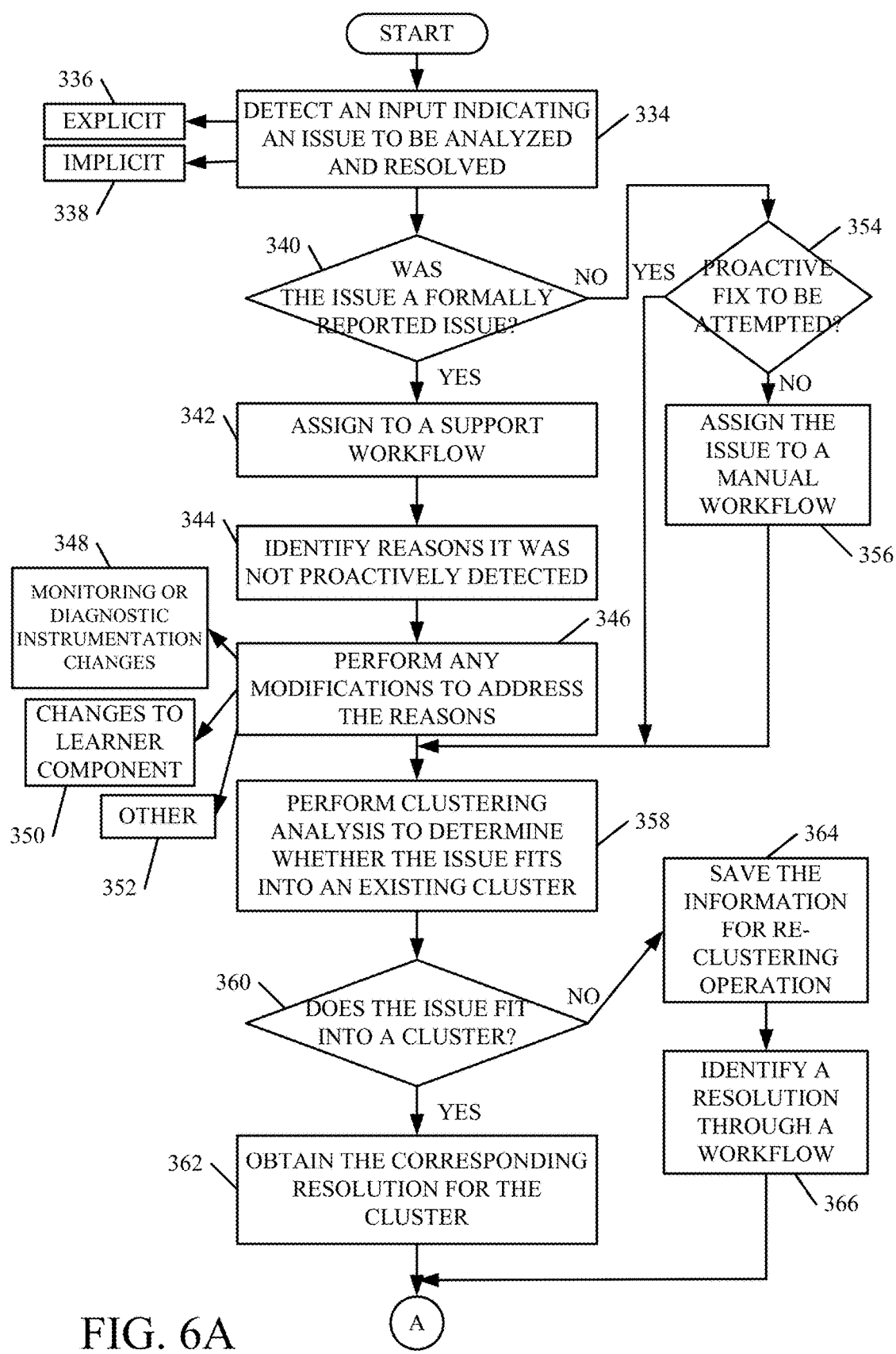
FIGS. 6A and 6B (collectively referred to herein as FIG. 6) show a flow diagram illustrating one example of the operation of the architecture shown in FIG. 2 in using the knowledge base, as well as feedback processing, to detect and resolve an issue during runtime.
Figure 6B:
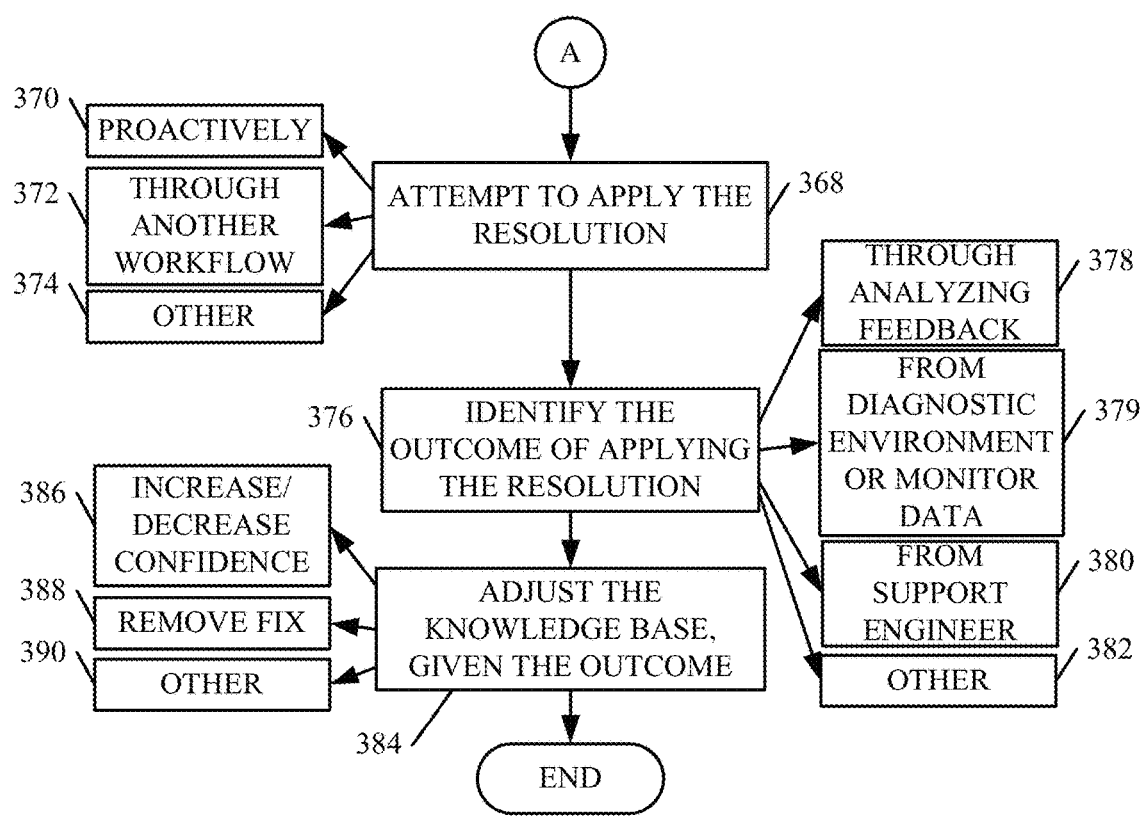

FIGS. 6A and 6B (collectively referred to herein as FIG. 6) show a flow diagram illustrating one example of how the information in resolution knowledge base 108 can be used to process new issues, as they are received by issue handing computing system 106. Data gathering component 152 first detects an input indicating that an issue needs to be analyzed and resolved. This is indicated by block 334 in FIG. 6. It can be through any of the mechanisms described above, and it can be an explicit indication 336 or an implicit indication 338.

Data gathering component 152 then determines whether the issue was a formally reported issue, such as a user support request 202 that is provided through support request system 172. This is indicated by block 340 in FIG. 6.

If it is a user support request 202 that has been detected, then demultiplexer 170 assigns that issue to a support workflow component 174. This is indicated by block 342. The support workflow component 174 can include a workflow that enables a support engineer to identify the various reasons why the issue was not automatically, and implicitly, detected. For instance, it may be that there was no monitoring instrumentation that was deployed, that could have detected the issue before the support request was submitted. It may also be that learner component 160 may need an additional set of rules in order to identify the issue from implicit information. These are only two examples of the various reasons that the issue was not proactively detected, before the user support request 202 was submitted. Identifying the reasons is indicated by block 344 in FIG. 6.

The engineer or other personnel or component can then perform any modifications to address those reasons. This is indicated by block 346. For instance, it can deploy or implement monitor or diagnostic instrumentation changes so that the issue can be proactively detected. This is indicated by block 348. It can implement changes in learner component 160. This is indicated by block 350. It can perform other modifications or changes as well, so the issue can be automatically detected based on implicit information, and proactively addressed prior to a user submitting a formal support request. This is indicated by block 352.

If, at block 340, it is determined that the issue was not a formally reported issue, then proactive fixing system 148 determines whether a proactive fix is to be attempted, without assigning the issue to a manual workflow. This is indicated by block 354. For instance, it may be that proactive fixing component 148 has enough information to identify the resolution for the issue within resolution knowledge base 108, and to provide the fix, proactively, to the user's computing system. As an example, if the issue is that the user is about to run out of memory space, and that was implicitly detected, then the fix may be to provision extra memory space, automatically, for the user's system. In that case, proactive fixing system 148 can access knowledge base 108 to identify the resolution and apply it. However, it may be that the resolution needs to go through a workflow in order to be applied. Therefore, it will be assigned to a manual workflow as indicated by block 356.

Regardless of whether the issue is assigned to a workflow or a proactive fix is to be attempted, learner component 160 illustratively performs a clustering analysis in an attempt to identify whether the issue fits into an existing cluster in knowledge base 108. This is indicated by block 358. If so, as indicated by block 360, then learner component 160 identifies the corresponding resolution for that cluster. This is indicated by block 362. However, if not, then the information is saved by resolution knowledge base interaction system 110 for a later re-clustering operation, in which case a new cluster may be identified where the information fits. Saving the information for re-clustering is indicated by block 364.

A resolution is then identified through the workflow that the issue was assigned to. This is indicated by block 366. The system then attempts to apply the identified resolution. This is indicated by block 368. For instance, where the resolution was obtained automatically, then proactive fixing system 148 illustratively attempts to apply the resolution proactively. This is indicated by block 370. If not, then the system attempts to apply the resolution through the particular workflow to which the issue was assigned. This is indicated by block 372. Applying the resolution can be performed in other ways as well, and this is indicated by block 374.

The system then identifies the outcome of applying the resolution. This is indicated by block 376. In one example, for instance, data gathering component 152 continues to gather feedback (both implicit and explicit), corresponding to the issue. Learner component 160 illustratively analyzes the feedback to determine whether the resolution was successfully applied. This can be done by examining the monitor or diagnostic and environment information from the user's computer system to determine whether performance was enhanced or whether the issue was otherwise addressed. This can also be done by analyzing information from public facing sites 104 to see whether any of the site users are indicating that the solution was successfully applied. Identifying the outcome of the resolution by analyzing feedback is indicated by block 378.

In another example, where the resolution is obtained by a support engineer conducting a support workflow, then the support engineer illustratively provides an indication to data gathering component 152 as to the success or failure of the resolution. This is indicated by block 380. Identifying the outcome of applying the resolution from the diagnostic and environment or monitor data is indicated by block 379. Identifying the outcome of applying the resolution can be accomplished in other ways as well, and this is indicated by block 382.

Learner component 160 can then make adjustments to the knowledge base, given that outcome. This is indicated by block 384. For instance, it can increase a metric indicative of how many times the resolution has been successfully applied. This may be used to increase the confidence level for the suggested resolution. It can also indicate that it was unsuccessfully applied, and this can be used to decrease the confidence level corresponding to that suggested resolution, or to remove the resolution as a successful resolution or to identify it as an unsuccessful resolution. Increasing or decreasing the confidence level is indicated by block 386.

The knowledge base can also be adjusted to remove the fix or suggested resolution. This may be done, for instance, when the resolution has only been successfully applied a relatively small number of times, and it has now been unsuccessfully applied. Removing the resolution or fix is indicated by block 388. The knowledge base can be adjusted in other ways as well, and this is indicated by block 390.

It can thus be seen that the system advantageously uses diagnostic data, which can be contextual information, and which can include environment state or other environment data, along with performance or functional monitoring data or other implicit and explicit feedback to identify issues that need to be addressed. It can correlate them with social data and generate a knowledge base that can be used to self-heal issues when they subsequently arise. The implicit feedback signals can be received from sources such as telemetry data or remote monitoring data, system diagnostics that detect the type of database being used, the file system being used, a web server being used, etc. They can also include identifying process models (such as business process models) deployed in the customer's computing site. All of this information can be advantageously collected and used to identify not only issues, but solutions to those issues. Then, when a similar issue subsequently arises, the system advantageously identifies corresponding resolutions and can apply them to remedy the issue, even before a user submits a support request. Similarly, because all of the diagnostic and environmental information is collected around the issues, other systems or environments can be monitored to predict when the issue will arise. In that case, the resolutions can be proactively identified and applied, even before the issue arises. This not only significantly enhances the performance, accuracy, and efficiency of the user's computing systems, but it also significantly increases the speed at which issues can be identified and resolved, and it advantageously increases the efficiency of the issue detection and handling system.

Receiving user support requests launches a workflow that can be relatively costly. By proactively predicting or otherwise identifying issues and addressing them before such requests are filed, this can significantly enhance the overall architecture. Similarly, even where user support requests are submitted, by capturing the result of applying resolutions to the issue raised by the support request, the ability to predict and identify resolutions is also enhanced.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
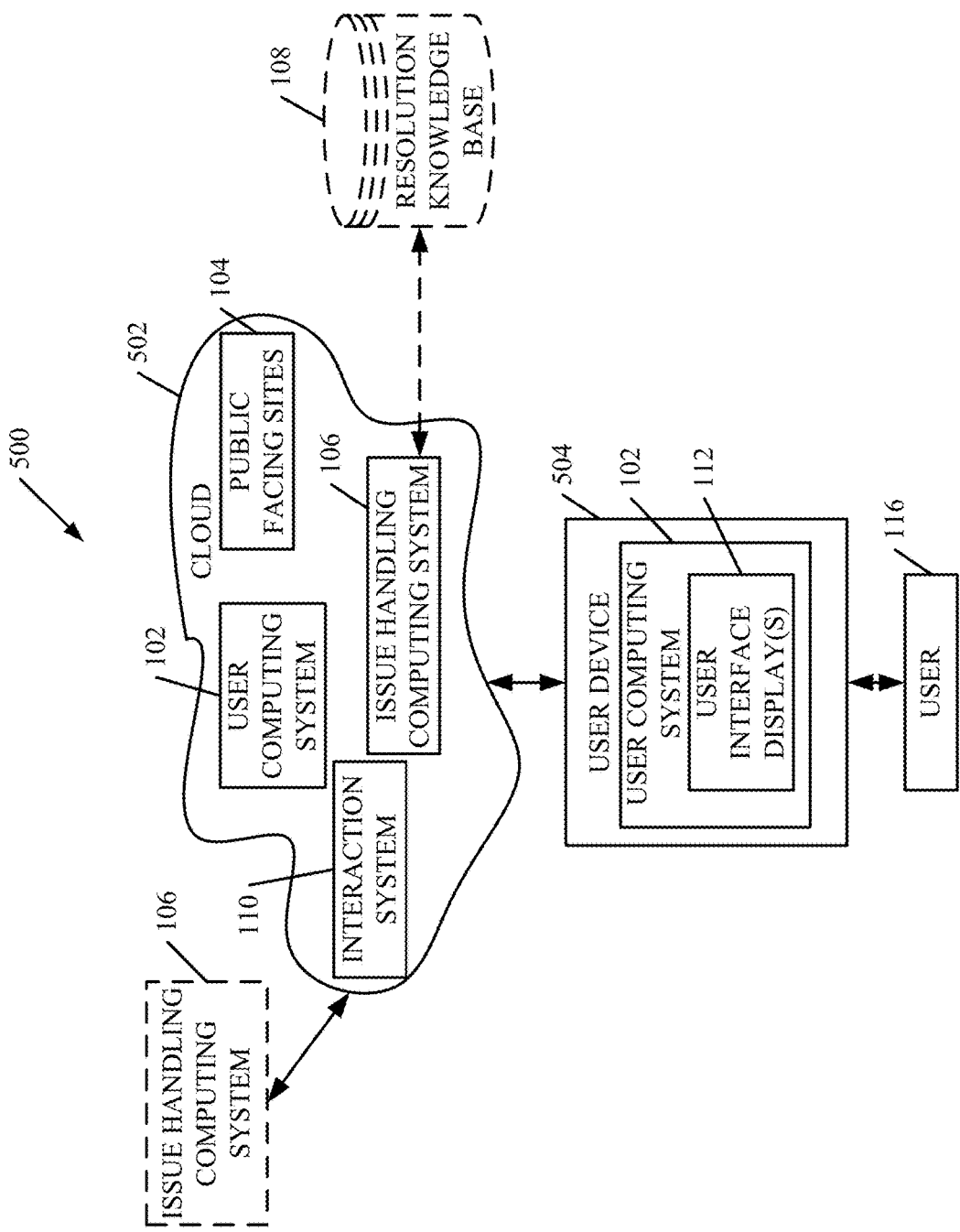
FIG. 7 is a block diagram of the architecture shown in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In one example shown in FIG. 7, some items are similar to those shown in FIG. 1 and they are similarly numbered. FIG. 7 specifically shows that systems 102, 104, 106 and 110 can be located in cloud 502 (which can be public, private, or a combination where portions are public while others are private). Therefore, user 116 uses a user device 504 (which can include user computing system 102) to access those systems through cloud 502.

FIG. 7 also depicts another example of a cloud architecture. FIG. 7 shows that it is also contemplated that some elements of architecture 100 can be disposed in cloud 502 while others are not. By way of example, data store 108 can be disposed outside of cloud 502, and accessed through cloud 502. In another example, system 106 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
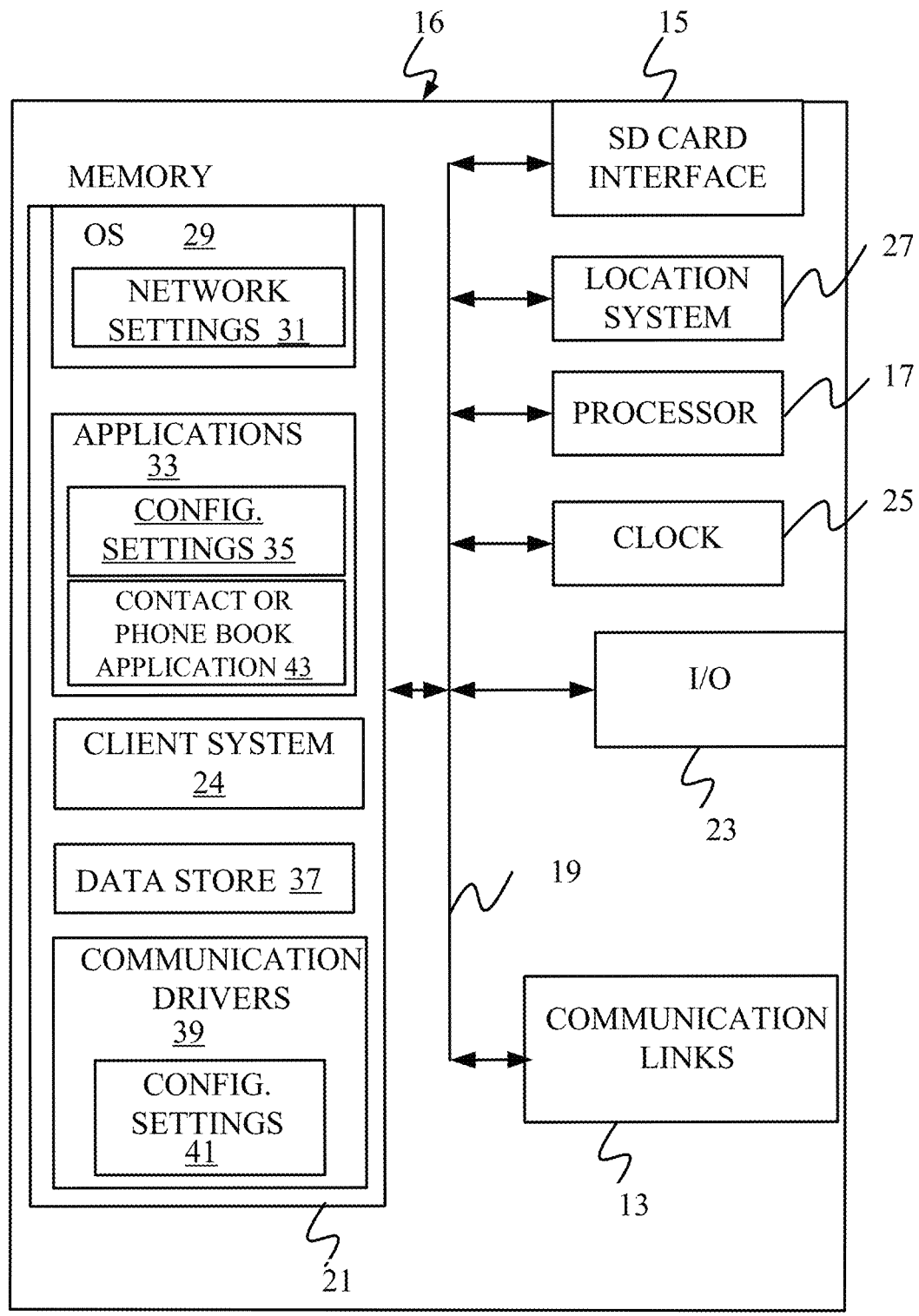
FIGS. 8-10 show various examples of mobile devices that can be used in the architectures shown in the previous figures.
Figure 9:
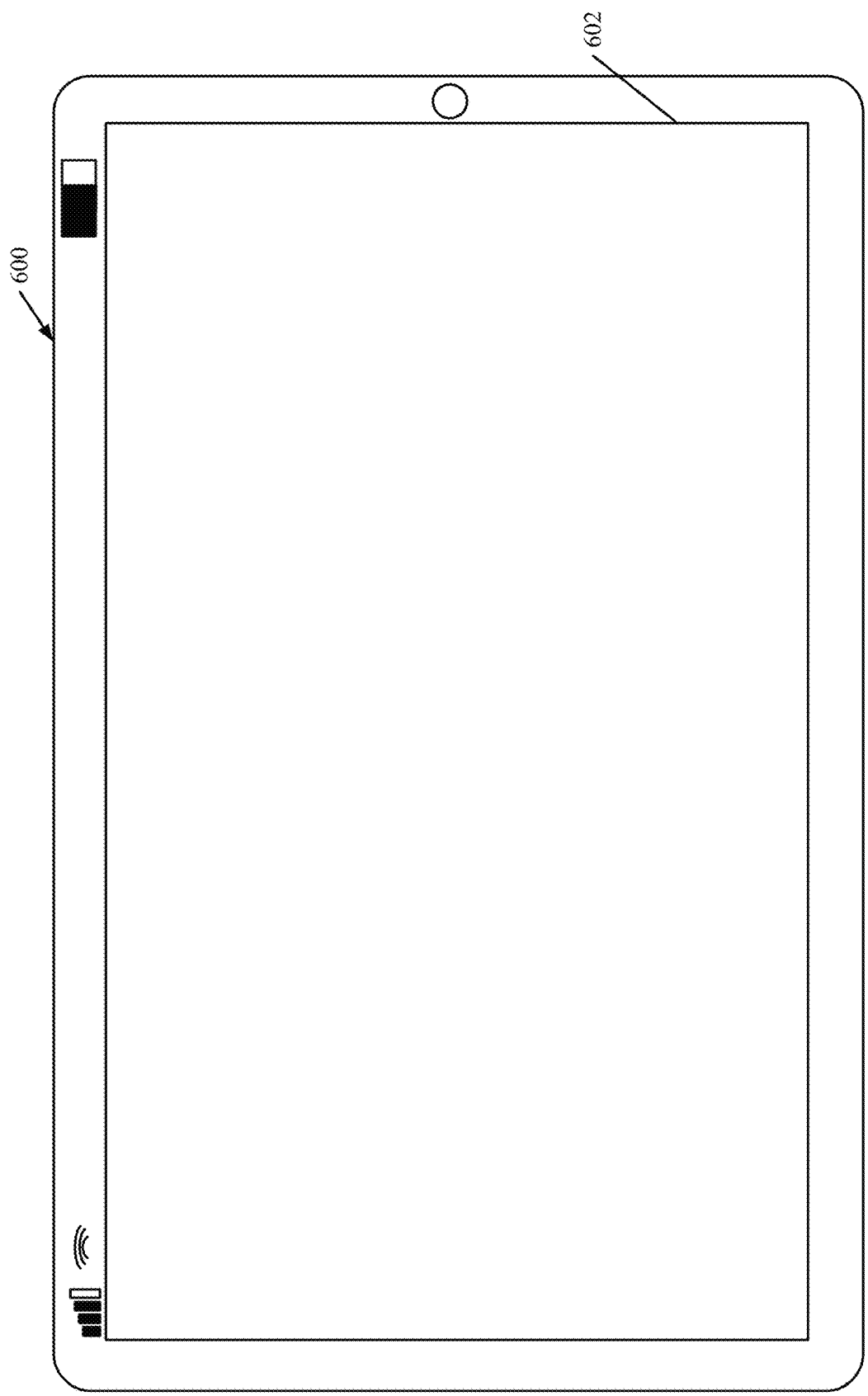
Figure 10:
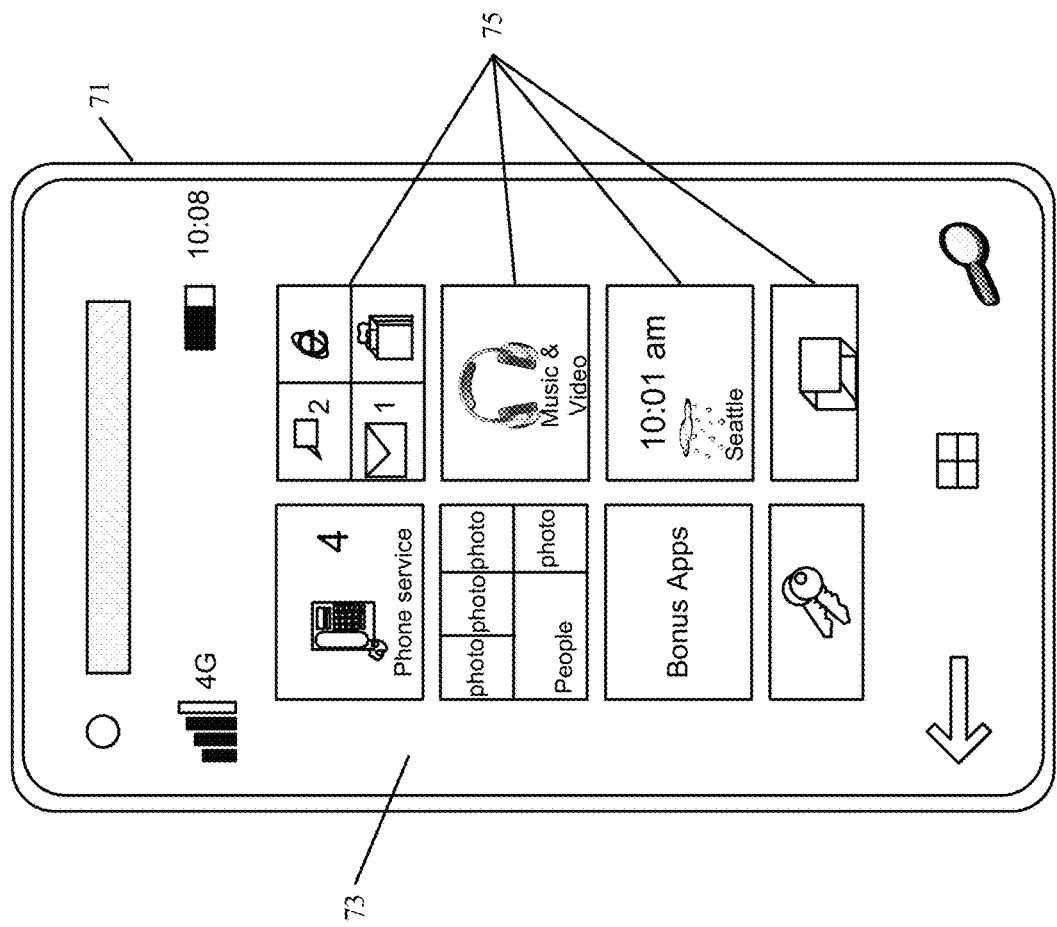

FIG. 8 is a simplified block diagram of one illustrative embodiment of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 118 or 142 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one embodiment in which device 16 is a tablet computer 600. In FIG. 9, computer 600 is shown with user interface display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples, the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 10 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
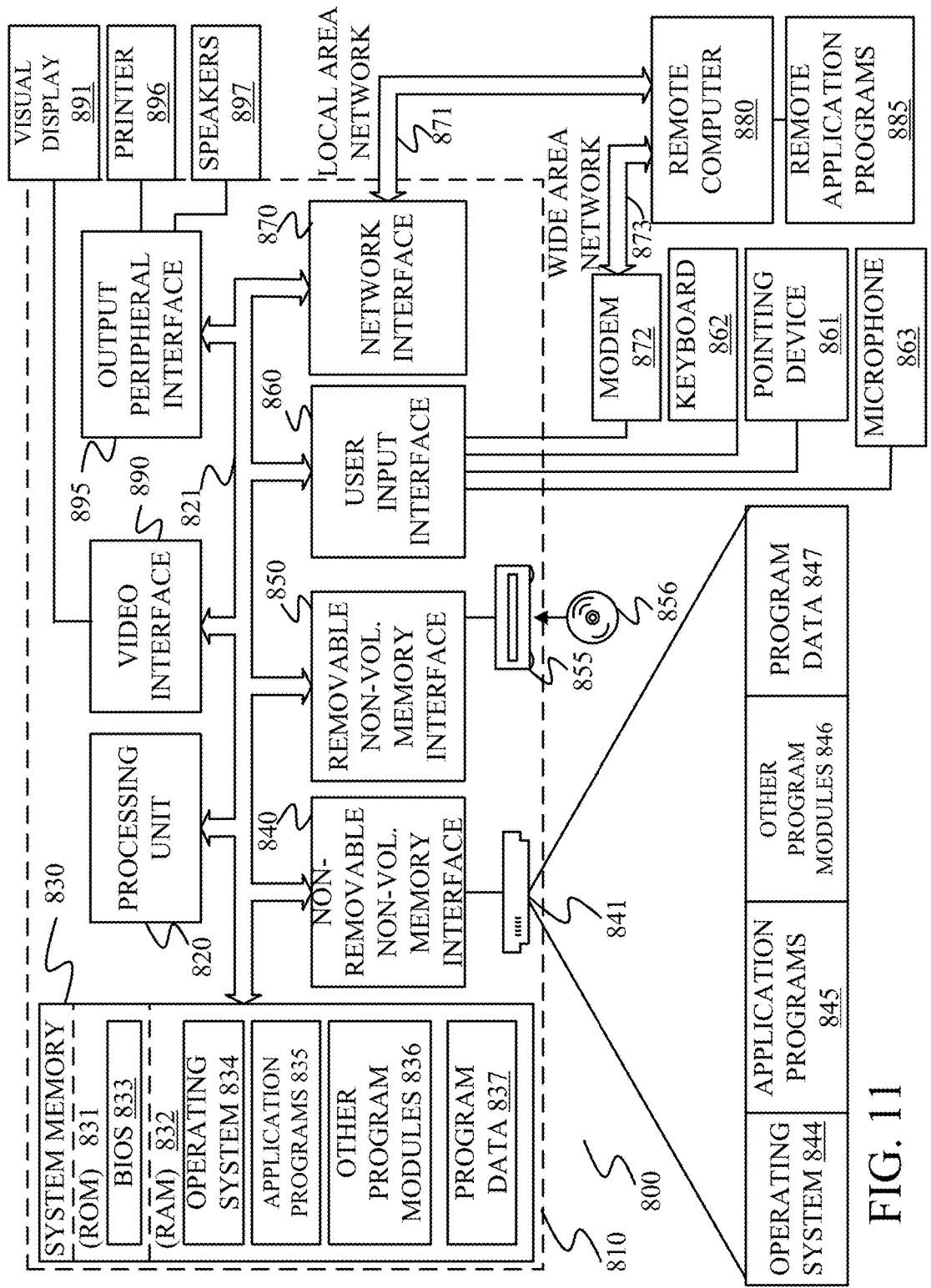
FIG. 11 is a block diagram of one example of a computing environment that can be used in the architectures shown in the previous figures.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 118 or 142), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an implicit data input component that receives implicit data inputs implicitly identifying a first computing system issue to be resolved in a given computing system;

a data gathering component that gathers the implicit data and identifies the first computing system issue to be resolved corresponding to the implicit data, and generates a source identifier indicative of a source of the implicit data;

a set of issue resolution workflow components that each conduct a different, corresponding issue resolution workflow; and a de-multiplexer that receives issue data comprising the implicit data, the source identifier and the first computing system issue to be resolved, selects an issue resolution workflow component based on the issue data and routes the issue data to the selected issue resolution workflow component that conducts the corresponding issue resolution workflow.

Example 2 is the computing system of any or all previous examples wherein the selected issue resolution workflow component generates a suggested resolution to the first computing system issue and wherein the data gathering component receives feedback data.

Example 3 is the computing system of any or all previous examples and further comprising:

a learner component that accesses the issue data and the feedback data and identifies from the feedback data whether the suggested resolution for the first computing system issue was successful in resolving the first computing system issue and, if so, stores the issue data and the suggested resolution in a knowledge store that identifies the suggested resolution as a successful resolution for the first computing system issue.

Example 4 is the computing system of any or all previous examples wherein the learner component accesses the knowledge store to determine whether the first computing system issue is represented by previous issue data in the knowledge store along with a corresponding resolution and, if so, surfaces the corresponding resolution from the knowledge store for one of the set of issue resolution workflow components that uses the corresponding resolution to resolve the first computing system issue.

Example 5 is the computing system of any or all previous examples wherein the learner component identifies the issue data as being predictive of the first computing system issue, before the first computing system issue materializes in the given computing system, and further comprising:

a proactive fix system that automatically applies the resolution corresponding to the first computing system issue to the given computing system to resolve the first computing system issue before it materializes in the given computing system.

Example 6 is the computing system of any or all previous examples wherein the data gathering component receives diagnostic data and performance monitoring data, from the given computing system, as the feedback data.

Example 7 is the computing system of any or all previous examples wherein the learner component determines whether the resolution applied to the given computing system was successful in resolving the first computing system issue based on the diagnostic data and the performance monitoring data received from the given computing system.

Example 8 is the computing system of any or all previous examples and further comprising:

a social listener component that generates community information for the data gathering component from a set of community sites as the feedback data and wherein the learner component determines whether the resolution applied to the given computing system was successful in resolving the first computing system issue based on the community information.

Example 9 is the computing system of any or all previous examples and further comprising:

an explicit data input component that receives explicit data inputs explicitly identifying a second computing system issue to be resolved in the given computing system, the data gathering component generating second issue data for the second computing system issue.

Example 10 is the computing system of any or all previous examples wherein the learner component determines whether the second computing system issue is a duplicate of the first computing system issue before the de-multiplexer routes the second issue data for the second computing system issue to an issue resolution workflow component.

Example 11 is the computing system of any or all previous examples wherein the social listener comprises:

a linguistic analyzer that analyzes community information inputs to identify linguistic content and sentiment in the community information inputs to generate the community information for the data gatherer.

Example 12 is the computing system of any or all previous examples wherein the social listener component generates the community information according to a predetermined schema.

Example 13 is the computing system of any or all previous examples wherein the learner component stores the issue data in the knowledge store by clustering issue data for a plurality of different issues to be resolved into clusters of common issues and stores successful resolutions for each of the common issues on the knowledge store.

Example 14 is a computer implemented method, comprising:

detecting implicit data inputs implicitly identifying a first computing system issue to be resolved in a given computing system;

identifying the first computing system issue to be resolved corresponding to the implicit data;

generating an issue identifier indicative of the first computing system issue;

generating a source identifier indicative of a source of the implicit data;

selecting an issue resolution workflow component, from a set of issue resolution workflow components that each conduct a different corresponding issue resolution workflow, based on issue data comprising the implicit data, the source identifier and the first computing system issue to be resolved; and routing the issue data to the selected issue resolution workflow component that conducts the corresponding issue resolution workflow.

Example 15 is the computer implemented method of any or all previous examples and further comprising:

accessing a resolution knowledge base to determine whether an existing, successful resolution to the first computing system issue is stored in the knowledge; and if so, surfacing the existing, successful resolution for the selected workflow component.

Example 16 is the computer implemented method of any or all previous examples wherein surfacing comprises automatically applying the existing, successful resolution to the given computing system.

Example 17 is the computer implemented method of any or all previous examples wherein the resolution knowledge base stores clusters of issues, each cluster corresponding to a set of issues that are similar to one another, and a set of existing, successful resolutions corresponding to each cluster and wherein accessing a resolution comprises:

identifying a cluster that the first computing system issue best matches; and ranking the existing, successful resolutions corresponding to the identified cluster, based on relevance criteria corresponding to the given computing system, and wherein surfacing comprises surfacing at least a top ranked existing, successful resolution.

Example 18 is the computer implemented method of any or all previous examples and further comprising:

identifying a resolution to the first computing system issue in the issue resolution workflow;

receiving implicit feedback information indicative of whether the identified resolution is successful in resolving the first computing system issue;

determining, based on the implicit feedback information, whether the identified resolution was successful; and if so, adding the identified resolution to a knowledge base of successful resolutions for the first computing system issue.

Example 19 is a computing system, comprising:

an implicit data input component that receives implicit data inputs implicitly identifying a first computing system issue to be resolved in a given computing system;

a data gathering component that gathers the implicit data and identifies the first computing system issue to be resolved corresponding to the implicit data, and generates a source identifier indicative of a source of the implicit data;

a set of issue resolution workflow components that each conduct a different, corresponding issue resolution workflow;

a de-multiplexer that receives issue data comprising the implicit data, the source identifier and the first computing system issue to be resolved, selects an issue resolution workflow component based on the issue data and routes the issue data to the selected issue resolution workflow component that conducts the corresponding issue resolution workflow wherein the selected issue resolution workflow component generates a suggested resolution to the first computing system issue and wherein the data gathering component receives feedback data; and a learner component that accesses the issue data and the feedback data and identifies from the feedback data whether the suggested resolution for the first computing system issue was successful in resolving the first computing system issue and, if so, stores the issue data and the suggested resolution in a knowledge store that identifies the suggested resolution as a successful resolution for the first computing system issue.

Example 20 is the computing system of any or all previous examples wherein the learner component accesses the knowledge store to determine whether the first computing system issue is represented by previous issue data in the knowledge store along with a corresponding resolution and, if so, surfaces the corresponding resolution from the knowledge store for one of the set of issue resolution workflow components that uses the corresponding resolution to resolve the first computing system issue, and further comprising:

a social listener component that generates community information for the data gathering component from a set of community sites as the feedback data and wherein the learner component determines whether the resolution applied to the given computing system was successful in resolving the first computing system issue based on the community information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
    an implicit data input component that is configured to receive an implicit data input implicitly identifying a first computing system issue to be resolved in a first computing system;
    a data gathering component that is configured to gather the implicit data and identify the first computing system issue to be resolved corresponding to the implicit data, and generate a source identifier indicative of a source of the implicit data;
    an explicit data input component that is configured to receive an explicit data input explicitly identifying a second computing system issue to be resolved in the first computing system, the data gathering component generating second issue data for the second computing system issue;
    a plurality of issue resolution workflow components that each conduct a different, corresponding issue resolution workflow;
    a de-multiplexer that is configured to receive issue data comprising the implicit data, the source identifier and the first computing system issue to be resolved, select an issue resolution workflow component based on the issue data and route the issue data to the selected issue resolution workflow component that conducts the corresponding issue resolution workflow;
    a learner component that is configured to access the issue data and the feedback data and to employ machine learning to identify from feedback data whether the suggested resolution for the first computing system issue was successful in resolving the first computing system issue and, if so, store the issue data and the suggested resolution in a knowledge store that identifies the suggested resolution as a successful resolution for the first computing system issue; and wherein the learner component determines whether the second computing system issue is a duplicate of the first computing system issue before the de-multiplexer routes second computing system issue data for the second computing system issue to an issue resolution workflow component.

2. The computing system of claim 1 wherein the selected issue resolution workflow component generates a suggested resolution to the first computing system issue and wherein the data gathering component receives feedback data.

3. The computing system of claim 1 wherein the learner component accesses the knowledge store to determine whether the first computing system issue is represented by previous issue data in the knowledge store along with a corresponding resolution and, if so, surfaces the corresponding resolution from the knowledge store for one of the set of issue resolution workflow components that uses the corresponding resolution to resolve the first computing system issue.

4. The computing system of claim 3 wherein the learner component identifies the issue data as being predictive of the first computing system issue, before the first computing system issue materializes in the given computing system, and further comprising:

a proactive fix system that automatically applies the resolution corresponding to the first computing system issue to the given computing system to resolve the first computing system issue before it materializes in the given computing system.

5. The computing system of claim 4 wherein the data gathering component receives diagnostic data and performance monitoring data, from the given computing system, as the feedback data.

6. The computing system of claim 5 wherein the learner component determines whether the resolution applied to the given computing system was successful in resolving the first computing system issue based on the diagnostic data and the performance monitoring data received from the given computing system.

7. The computing system of claim 1, and further comprising a social listener component that includes:

a linguistic analyzer that analyzes community information inputs to identify linguistic content and sentiment in the community information inputs to generate the community information for the data gatherer.

8. The computing system of claim 7 wherein the social listener component generates the community information according to a predetermined schema.

9. The computing system of claim 3 wherein the learner component stores the issue data in the knowledge store by clustering issue data for a plurality of different issues to be resolved into clusters of common issues and stores successful resolutions for each of the common issues on the knowledge store.

10. A computing system, comprising:

an implicit data input component that is configured to receive an implicit data input implicitly identifying a first computing system issue to be resolved in a first computing system;

a data gathering component that is configured to gather the implicit data and identify the first computing system issue to be resolved corresponding to the implicit data, and generate a source identifier indicative of a source of the implicit data;

an explicit data input component that is configured to receive an explicit data input explicitly identifying a second computing system issue to be resolved in the first computing system, the data gathering component generating second issue data for the second computing system issue;

a plurality of issue resolution workflow components that each conduct a different, corresponding issue resolution workflow;

a de-multiplexer that is configured to receive issue data comprising the implicit data, the source identifier and the first computing system issue to be resolved, select an issue resolution workflow component based on the issue data and route the issue data to the selected issue resolution workflow component that conducts the corresponding issue resolution workflow wherein the selected issue resolution workflow component generates a suggested resolution to the first computing system issue and wherein the data gathering component receives feedback data;

a learner component that is configured to access the issue data and the feedback data and to employ machine learning to identify from the feedback data whether the suggested resolution for the first computing system issue was successful in resolving the first computing system issue and, if so, stores the issue data and the suggested resolution in a knowledge store that identities the suggested resolution as a successful resolution for the first computing system issue, the learner component accesses the knowledge store to determine whether the first computing system issue is represented by previous issue data in the knowledge store along with a corresponding resolution and, if so, surface the corresponding resolution from the knowledge store for one of the set of issue resolution workflow components that uses the corresponding resolution to resolve the first computing system issue; and wherein the learner component determines whether the second computing system issue is a duplicate of the first computing system issue before the de-multiplexer routes second computing system issue data for the second computing system issue to an issue resolution workflow component.

11. The computing system of claim 10, and further comprising a social listener component configured to generate community information for the data gathering component from a community site as the feedback data.

\* \* \* \* \*